(12) United States Patent
Blanton (10) Patent No.: US 8,905,411 B1
(45) Date of Patent: Dec. 9, 2014

(54) REUSABLE SHOPPING BAG AND CART SYSTEM FOR IMPROVED REGISTER CHECKOUT

(71) Applicant: Fred T. Blanton, Spring, TX (US)

(72) Inventor: Fred T. Blanton, Spring, TX (US)

( * ) Notice: Subject to any disclaimer, the term of this patent is extended or adjusted under 35 U.S.C. 154(b) by 0 days.

(21) Appl. No.: 14/073,855

(22) Filed: Nov. 6, 2013

(51) Int. Cl.
 *B62D 39/00* (2006.01)
 *B62B 3/00* (2006.01)
 *B62B 3/10* (2006.01)
 *B65D 33/06* (2006.01)

(52) U.S. Cl.
 CPC .............. *B62B 3/005* (2013.01); *B62B 3/106* (2013.01); *B65D 33/06* (2013.01)
 USPC .............. 280/33.992; 280/47.35; 280/33.991

(58) Field of Classification Search
 USPC ............ 280/47.17, 47.18–47.19, 47.2, 47.24, 280/47.26–47.28, 63, 79.2, DIG. 6
 See application file for complete search history.

(56) References Cited

U.S. PATENT DOCUMENTS

| | | | |
|---|---|---|---|
| 4,560,096 A | 12/1985 | Lucas et al. | |
| 4,871,100 A | 10/1989 | Posner | |
| 5,182,895 A | 2/1993 | Lugo | |
| 5,513,823 A * | 5/1996 | Bresnahan | 248/99 |
| 5,531,366 A | 7/1996 | Strom | |
| 5,722,594 A * | 3/1998 | Farr et al. | 280/643 |
| 5,961,018 A | 10/1999 | Abelbeck et al. | |
| 8,418,448 B2 * | 4/2013 | Kamata et al. | 60/322 |
| 8,424,816 B1 * | 4/2013 | Marsh | 248/100 |
| 2004/0208397 A1 | 10/2004 | Yi | |
| 2008/0088101 A1 | 4/2008 | Ferguson | |
| 2009/0020657 A1 * | 1/2009 | Dayton et al. | 248/100 |
| 2010/0021088 A1 * | 1/2010 | Wilfong, Jr. | 383/23 |

FOREIGN PATENT DOCUMENTS

EP 1792548 A2 6/2007

* cited by examiner

*Primary Examiner* — John Walters
*Assistant Examiner* — James Triggs
(74) *Attorney, Agent, or Firm* — Kenneth A. Roddy (57) ABSTRACT

A reusable shopping bag and cart system for improved checkout and bagging procedures. The reusable shopping bags have elongate carrying handles at the upper end of opposed end wall panels for carrying them in the manner of a conventional "tote" type shopping bag, and include sleeves or loops on opposed side wall panels that allow them to be slipped over and suspended in a full open condition from the arms of conventional "T-shirt bag" holding racks and also over bag support members of specially designed shopping carts. The bags may also have shorter support handles at the upper end of the side wall panels for supporting them on the shopping carts. The bags and carts may be utilized in improved checkout, scanning, and bagging procedures employing filled bags supported on the cart and one empty bag supported on the cart or the arms of the bag holding rack.

6 Claims, 10 Drawing Sheets

REUSABLE SHOPPING BAG AND CART SYSTEM FOR IMPROVED REGISTER CHECKOUT

BACKGROUND OF THE INVENTION

1. Field of the Invention

This invention relates generally to reusable shopping bags and shopping carts, and more particularly to a reusable shopping bag and cart system for improved efficiency of register checkout and bagging procedures.

2. Background Art

In the United States and other countries, when shopping in grocery and large retail stores, it is common for a customer to obtain a shopping cart or basket, place the items to be purchased into the cart or basket and then proceed to a checkout station or cashier to register and pay for items.

In using a conventional checkout arrangement, a customer unloads a shopping cart or basket of items onto a conveyor belt which conveys the items to a cashier or checker who then scans them utilizing a bar code scanner. Conveyors have been found to posses numerous bacteria, and cross contaminations from meat, poultry and other food products that come into contact with conveyor. Extensive decontamination between customers is seldom done, thus passing disease, germs and bacteria from customer to customer. The elimination of the conveyor reduces this problem. The scanned items are then placed by the checker onto an inclined ramp or a second conveyor which conveys them to a collection area that is adjacent to a bagging station having a rack with outwardly extending arms that hold a large number of plastic bags, commonly known as "T-shirt" bags, which are suspended on the arms in a compact closed condition. A dedicated bagger, or in some cases the customer, then opens a suspended plastic bag and places the scanned items into the bag.

"Self-serve" checkout stations are also common in grocery and large retail stores. The conventional "self-serve" checkout station typically has a conveyor belt or a stationary rubberized top surface on one side of the bar code scanner and a bagging station on the other side of the scanner. As described above, the bagging station has a rack with outwardly extending arms that hold a large number of plastic bags or "T-shirt" bags, which are suspended on the arms in a compact closed condition. In the "self-serve" checkout procedure, a customer unloads a shopping cart or basket of items onto the conveyor belt top surface of the checkout counter, or manually takes each item directly from the cart, and then scans them across the bar code scanner. The customer then bags the scanned items after having opened a bag. The passing of merchandise, meat, poultry and produce, once again, creates the contamination hazard.

Needless to say, retailers have to purchase and provide a huge quantity of plastic or paper bags to enable the customer to depart the store with the purchased items. Disposable non-biodegradable plastic bags, suffer from a number of environmental disadvantages. The use of plastic bags poses problems because plastic is not biodegradable and the amount of landfill space is decreasing. While paper bags are biodegradable, great emphasis is being placed on the conservation of forests and wood products. Thus, a growing trend has been to reduce the use of paper and plastic and move towards reusable bags.

The detrimental environmental impact and waste caused by the use of non-biodegradable plastic bags has resulted in a global push to curb the use of plastic bags, which environmentalists say can take up to 1,000 years to disintegrate and pose threats to marine life, birds and other animals. Some cites in the U.S. have outlawed non-biodegradable plastic bags from large supermarkets, and the state of California has enacted a law that requires large stores to take back plastic bags and encourage their reuse.

The world's largest retailer, Wal-Mart Stores Inc., recently announced that will give out fewer plastic shopping bags and encourage shoppers to use reusable bags in an effort to cut its worldwide plastic shopping bag waste by an average of 33 percent per store by 2013, which could eliminate more than 135 million pounds of plastic waste globally.

Many other retailers are also taking steps to cut down on the large numbers of plastic bags that end up in landfills. IKEA, for example, recently instituted a program to steer customers toward purchasing its reusable "Big Blue Bag" or using an alternative reusable bag, and charging extra if the customer chooses conventional plastic bags. The goal of the program was to reduce plastic bag consumption in its U.S. stores by 50 percent; from 70 million to 35 million plastic bags in the first year. A year after the program began; more than 92 percent of IKEA's customers have stopped buying plastic bags. With that result in hand, Ikea took another step forward and no longer offers conventional plastic or paper bags.

Another concern regarding conventional checkout procedures, and reason for the movement toward reusable bags, is the sanitation issue, particularly in grocery stores. During normal operating hours, there is little or no control over the sanitary condition of the conveyor belts, shopping carts, fixed scanners, the collection area, or the bagging area. Germs and the cross contamination of beef, pork, chicken, vegetables, fruits and other contaminates can transmit and transfer *Salmonella* and other viruses, bacteria and diseases. Each shopper has no idea of what was on the conveyor before they placed their food items on it, or what they may be coming into contact with.

Although it is desirable to replace non-biodegradable plastic bags with reusable shopping bags, there is no standardized system for holding, positioning, or loading reusable shopping bags or consumer owned shopping bags.

Lucas et al, U.S. Pat. No. 4,560,096 discloses a detachable flexible bag for use in a conventional open topped supermarket trolley container. The bag has a flat base part to rest in the bottom of the trolley container and upstanding walls to receive within them a supply of goods. The upper peripheral area of the bag has, on opposite sides thereof, similar downwardly facing hook members permanently secured to the upper peripheral area for engaging over the upper periphery of a supermarket trolley container to suspend the opposite sides of the bag from the upper end thereof. The hook members are engageable one with the other to close the bag, and strap handles are attached to the bag on opposite sides thereof for attaching the upper portion of the bag to either side of a respective hook member.

Posner, U.S. Pat. No. 4,871,100, discloses a shopping bag for use with a supermarket shopping cart. The bag has a stiffened rectangular base adapted to fit into a shopping cart and foldable sides upstanding from the base with an open top, two opposed sides having stiffened upper edges adapted to hang from the upper edges of a shopping cart basket hold the bag open in the cart. The stiffened upper edges may have arcuate slots convex towards the base adapted to fit over the upper edges of side walls of a shopping cart. In another arrangement, the stiffened upper edges have projecting tongue members adapted to hook over the upper edges of side walls of a shopping cart.

Lugo, U.S. Pat. No. 5,182,895 discloses a shopping bag system and method which includes a lightweight compact carrier for carrying a set of reusable shopping bags. The set of shopping bags comprise a plurality of reusable bags that are folded into a compact shape and placed on one edge and stacked horizontally in a side by side manner inside the carrier. The entire bottom surface or a band having an identifying color is printed on the bottom surface of each bag which identifies the size of the bag and enables the user to identify and select the correct bag structure from the set of shopping bags. Optional colored coded elements may be printed on the outside surface of the front and rear surfaces of the carrier to help the user select the correct bag. The lid panel of the carrier may be folded back over and attached to the back side of the carrier to attach the carrier to a shopping cart.

Strom, U.S. Pat. No. 5,531,366 discloses a reusable shopping bag assembly having collapsible expandable soft sided bags which can be rolled up from an upper open end in a spiral shape, the bags having a bottom end with a plurality of holes to permit air flow therethrough for allowing the bags to be rolled up into a compact shape. A pair of hanger bars are attached to opposite bag sides adjacent the upper open end of the bags. Opposite ends of each hanger bar extending beyond opposite bags sides for engagement with spaced apart upper edges of a shopping cart to suspend the bags in a shopping cart when the bags are unrolled. A carrying case is provided for carrying the bags in a rolled state.

Abelbeck et al, U.S. Pat. No. 5,961,018, discloses a tote bag for transporting personal items such as those commonly taken to do shopping, and storing them in an easily accessible manner to a shopping cart or stroller handle. The bag may also include a second side for children riding in the child's seat of a shopping cart. The tote bag is comprised of one or more flaps, at least some of which include pockets for storing items that would be necessary to a shopper or child, and a pliable portion that is capable of flexing around and fastening to the handle of a shopping cart or stroller. The tote bag may be removably attached to the handle if the shopper brings their own to the store or permanently secured to the handle as an accessory to the cart.

Yi, U.S. Published Application 2004/0208397, discloses a shopping bag which is attachable to a cart for carrying items in a shop, which includes: a handle frame having at least two fixing frames attached to each of both handle frames of a shopping bag for fixing the shopping bag to the cart; a coin storing member for storing a coin in the handle frame which is used for unlocking a cart from a locked state, and the handle; a Velcro® tape attached to an upper side of the shopping bag for closing an entrance of the shopping bag; and an outer layer pocket for storing purchased items.

Ferguson, U.S. Published Application 2008/0088101, discloses a shopping cart having knobs, ridges or other protrusions in the side walls of the cart upon which plastic store bags can be hung by their handles, and a method of hanging store bags from the protrusions. The bag hanging protrusions may also be adapted to retain a tray.

Eisenberg et al, U.S. Published Application 2009/0232420, discloses a grocery cart bagging system that includes a series of four bags, each designed to be reusable and capable of standing upright when in an open state. The bags are constructed so that they will fit in an open state within a shopping cart, and differ progressively in size so that they can be nested inside of each other for storage. The nested bags are then folded to form a compact, single package which can be easily transported by a user to a store for shopping.

Berni, European Application EP 1792548, discloses a bag made of flexible material applicable to shopping carts, comprising a container body made of flexible material with an inlet which has, on mutually opposite edges of the inlet, grip elements that form means for suspended coupling to a shopping cart. The bag further comprises, in the container body, at least one compartment which is delimited by thermally insulating walls and is provided with opening and closure means.

SUMMARY OF THE INVENTION

The present invention overcomes the aforementioned problems, and is distinguished over the prior art in general and these patents in particular, by a reusable shopping bag and cart system for improved efficiency of register checkout and bagging procedures. Briefly stated, the present reusable shopping bags have elongate flexible loop-type carrying handles at the upper end of the opposed end wall panels so that they be carried in the manner of a conventional "tote" type shopping bag, and also include transverse sleeves or loops on the opposed side wall panels that allow them to be slipped over and suspended from the arms of conventional existing "T-shirt bag" holding racks and fixtures commonly found in the bagging area of stores, and/or over bag support members of specially designed shopping carts. The reusable shopping bags also have a shorter flexible loop-type support handles at the upper end of the side wall panels for supporting one or more of the bags in an upright full open condition on a specially designed shopping cart. A wall or pantry rack may also be provided that is designed to receive and hold a number of the reusable bags in a loaded condition.

Another aspect of the present invention is an improved register checkout and bagging procedure utilizing the reusable shopping bag and cart system wherein one empty reusable shopping bag is used at the checkout area. The empty reusable bag is placed on the arms of the conventional existing "T-shirt bag" holding rack or fixture in the bagging area. The customer then takes each item out of a loaded bag, scans it across the bar code scanner, and places it into the empty bag on the arms of the bag holding rack. After the previously empty bag has been filled, it can be removed, and the customer can then place the bag from which the items were unloaded (which is now empty) onto the arms of the bag holding rack and repeat the process until all of the items have scanned and bagged.

In another checkout method using a handheld scan gun, an empty bag may be supported in a full open position on the specialized cart adjacent to the filled bags and remain in the cart throughout the checkout process, and the items are merely removed from a filled bag, scanned and placed in the adjacent empty bag and the process continues, until all bags have been scanned. A unique bar code may be attached to each bag that will associate it with its owner or the customer that is purchasing the bag, thus providing a tracking shopping list service for future shopping visits and electronic reminders.

The loaded reusable bags can then be placed back onto the shopping cart and transported to the customer's vehicle, or simply be carried by hand in the manner of a conventional "tote" type shopping bag, depending upon the number of loaded bags.

One of the significant features and advantages of the present invention is that it provides a reusable shopping bag and cart system that significantly improves the efficiency of register checkout and bagging procedures.

Another significant feature and advantage of the present reusable shopping bag and cart system is that it can be used with conventional existing "T-shirt bag" holding racks and fixtures commonly found in the bagging area of stores, and with the cart adapter can be used with conventional existing shopping carts.

Another significant feature and advantage of the present reusable shopping bag and cart system is that it will reduce the detrimental environmental impact and waste caused by the use of non-biodegradable plastic bags.

Another significant feature and advantage of the present reusable shopping bag and cart system is that it will provide retailers with a standardized system for utilizing reusable bags for shopping, register checkout, and bagging operations.

A further significant feature and advantage of the present reusable shopping bag and cart system is that it does not require items that are to be scanned to be placed directly into a conveyor belt, thereby reducing the likelihood of germs, contaminants, and cross contamination of food products.

A still further significant feature and advantage of the present reusable shopping bag and cart system is that it allows retailers to reduce overhead costs and the number of personnel required to perform checkout procedures.

Other features and advantages of the invention will become apparent from time to time throughout the specification and claims as hereinafter related.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
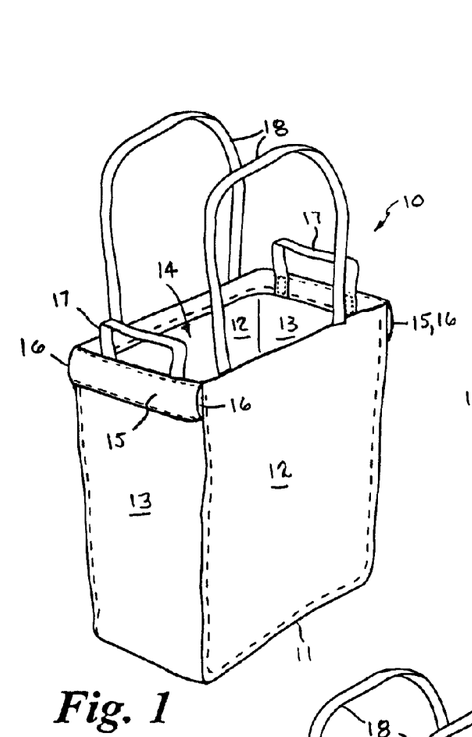
FIG. 1 is a perspective view of a reusable shopping bag in accordance with the present invention.
Figure 1A:
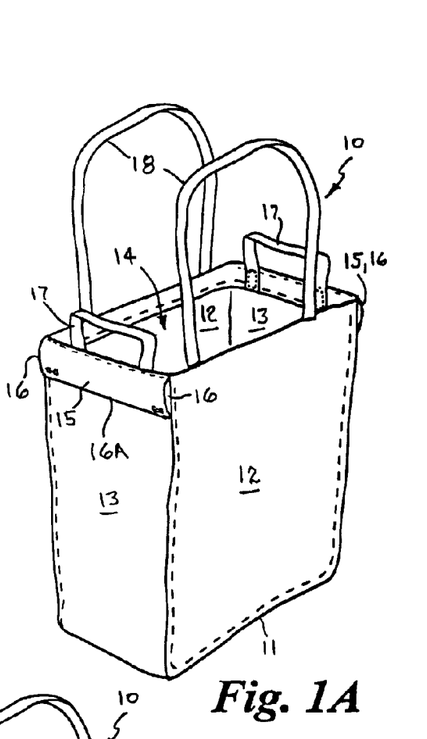
FIG. 1A is a perspective view of a modification of the reusable shopping bag in accordance with the present invention having a sleeve/pocket on the laterally opposed side wall panels.
Figure 2:
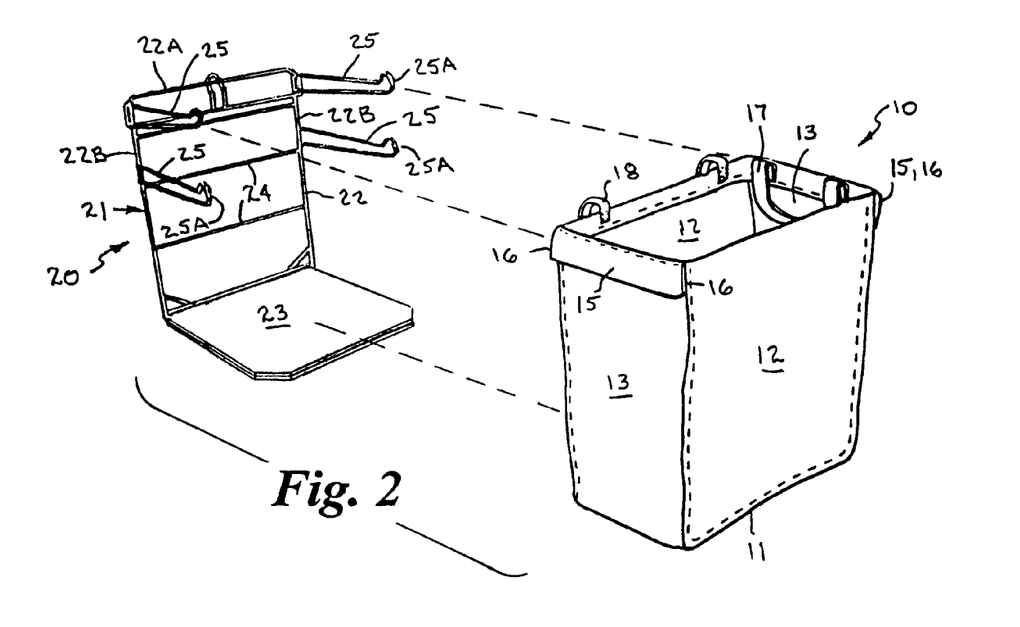
FIG. 2 is a perspective view showing the reusable shopping bag being placed onto the laterally opposed arms of a conventional "T-shirt bag" holding rack commonly found in the bagging area of a store.

Referring to the drawings by numerals of reference, there is shown in FIGS. 1, 1A, and 2, a preferred expandable and collapsible reusable shopping bag 10 in accordance with the present invention. The reusable shopping bag 10 is a generally rectangular soft-sided configuration formed of a durable washable flexible material such as, for example, canvas or nylon, and has a bottom wall panel 11, opposed front and rear end wall panels 12, and two laterally opposed side wall panels 13, defining an open top end or mouth opening 14 and an interior volume. The opposed front and rear end wall panels 12 are of a width greater than the width of the laterally opposed side wall panels 13.

In a preferred embodiment, reusable shopping bag has a width (distance between the opposed sides 13) sufficient to fit between the outwardly extending laterally opposed arms of conventional existing "T-shirt bag" holding racks and fixtures commonly found in the bagging area of stores. For example, the arms of many conventional existing "T-shirt bag" holding racks are spaced laterally apart a distance to accommodate a standard 12" wide "T-shirt bag". In a non-limiting example, the width of the front and rear end wall panels 12 may be about 12", the width of the side wall panels 13 may be about 7", and the height of the bag 10 may be in the range of about 10" to about 14".

A generally rectangular strip or flap of flexible material overlies the exterior of the upper portion of each of the side wall panels 13 and is secured to the exterior of the side wall panels along vertically opposed longitudinal sides to form an elongated loop or sleeve 15 extending transversely along the side wall panels having open ends 16 for slidably receiving the outwardly extending laterally opposed arms of a conventional existing "T-shirt bag" holding rack and supporting the bag in a fully open condition, as shown in FIG. 2.

A shorter flexible loop-type support handle 17 is secured to the upper end portion of each of the narrower laterally opposed side wall panels 13 of the reusable shopping bag, for supporting one or more of the bags in a full open condition on a specially designed shopping cart (described hereinafter).

A longer elongate flexible loop-type carrying handle 18 is secured to the upper end portion of each of the wider opposed front and rear end wall panels 12 of the reusable shopping bag 10, for carrying one or more of the bags in the manner of a "tote" type shopping bag.

FIG. 1A shows a modification of the reusable shopping bag 10 wherein the lower (bottom) longitudinal side of the loop or sleeve 15 is secured to the exterior of the side wall panel 13 only at the bottom corners of the sleeve to form a combination sleeve/pocket. In other words, the sleeve has openings 16 at each end, as described above, and also an opening 16A along its lowermost longitudinal side extending between the bottom corners to form an inverted pocket for slidably receiving an inverted generally U-shaped bag support member of a support arm on a specially designed shopping cart (described hereinafter).

Figure 1B:
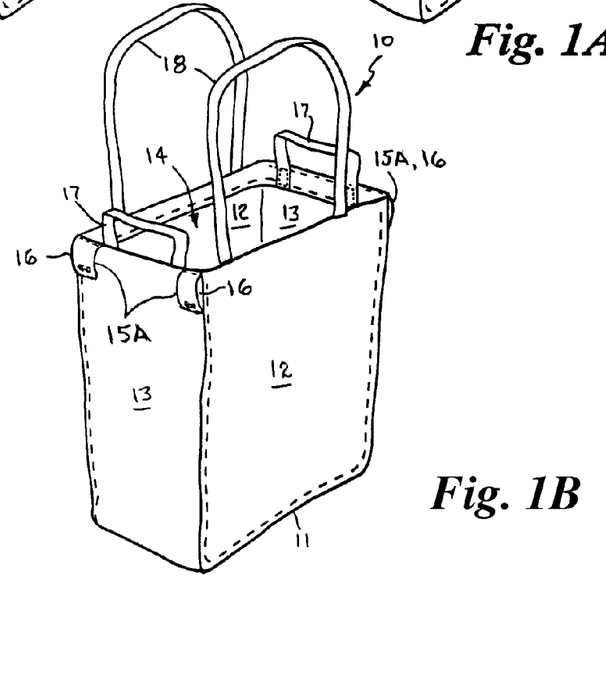
FIG. 1B is a perspective view of another modification of the reusable shopping bag having a pair of loops disposed in laterally spaced relation near the corners of the side wall panels and the front and rear end wall panels.

FIG. 1B shows another modification of the reusable shopping bag 10 wherein a pair of generally rectangular narrow strips or flaps of flexible material each overlie the exterior of the upper portion of each of the side wall panels 13 and are secured to the exterior of the side wall panels 16 to form a pair of loops 15A disposed in laterally spaced relation near the corners of the side wall panels 16 and the front and rear end wall panels 12 for slidably receiving the outwardly extending laterally opposed arms of a conventional existing "T-shirt bag" holding rack and supporting the bag in a fully open condition. It should be understood that the pairs of loops 15A may be disposed near the corners of the side wall panels 16 adjacent to the intersection of either one or both of the front and rear end wall panels 12.

In the modifications of FIGS. 1A and 1B, the reusable bag can be supported in a full open condition on the outwardly extending laterally opposed arms of a conventional existing "T-shirt bag" holding rack, on support arms of a specially designed cart, or on inverted generally U-shaped bag support members of specially designed cart (described hereinafter). Also in these modifications the reusable bag may or may not be provided with the shorter flexible loop-type support handle 16.

FIG. 2 shows a perspective view of a conventional standing bag holding rack 20, well known in the art, for holding and supporting plastic T-shirt bags, which includes a main frame 21 formed of a bent wire. The frame 21 has a central portion bent to define a rectangular back 22 comprised of a transverse top wire section 22A having at each end thereof downwardly extending vertical side sections 22B. Each of the vertical side wire sections 22B has a forwardly extending bottom wire section, the respective terminal ends which are engaged in apertures in a generally rectangular base member 23, in a conventional manner. A series of intermediate wire cross members 24 extend transversely between the vertical side wire sections 22B. A pair of cantilevered support arms 25 formed of bent wire are each secured at their back ends to the upper portion of the vertical side wire sections 22C of the rack 20 in laterally opposed relation and extend forwardly a distance therefrom above the base 23. In the illustrated example, the outer ends of the support arms 25 are formed to have the shape of an upwardly directed looped protuberance 25A. Also in the illustrated example, a second pair of cantilevered support arms 25, as previously described, is secured at their back ends to the upper portion of the vertical side wire sections 22B a distance beneath the first pair. It should be understood that the present reusable bags 10 may be utilized with other conventional standing racks of different construction, and racks having only one pair of outwardly extending support arms for supporting plastic T-shirt bags.

As represented by dashed line, the reusable bag 10 may be supported on and suspended from the outwardly extending support arms 25 of the conventional "T-shirt bag" holding rack 20 by slipping the open-ended sleeve 15 at the upper end of the end wall panels 13 over the support arms, such that the bag is supported in a fully open condition. It should be understood that the modification of FIG. 1A having the combination sleeve/pocket and the modification of FIG. 1B having pairs of loops 15A on the side walls may be supported in a full open condition on the outwardly extending laterally opposed arms of a conventional existing "T-shirt bag" holding rack in the same manner.

Bag Supporting Cart

Figure 3A:
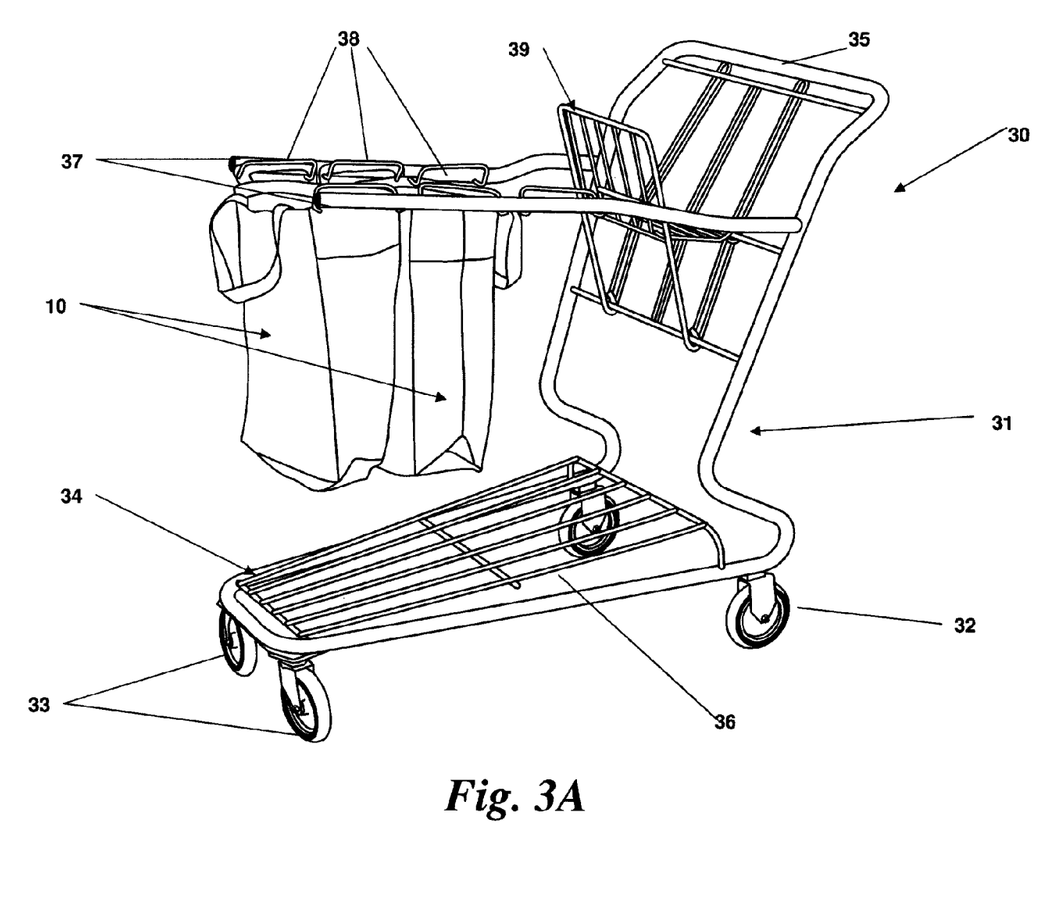
FIG. 3A is a perspective view of a first embodiment of a shopping cart having a pair of support arms for supporting and transporting a plurality of the present reusable shopping bags.

FIG. 3A is a perspective view of a first preferred embodiment of a bag supporting shopping cart 30 for supporting and transporting a plurality of the present reusable shopping bags 10. The shopping cart 30 includes a frame 31 supported on a pair of rear wheels 32 and a pair of front wheels 33, with each of the front wheels being mounted on a caster. The frame may be constructed of tubular aluminum or steel, or any other suitable material such as plastic as long as strength and durability considerations are satisfied.

The frame 31 includes a generally U-shaped lower section 34 having a curved front portion and a pair of lower lateral side rails that extend rearwardly therefrom diverging along their length and curve upwardly at their rear end portions and extend upward to form a pair of sloping lateral side portions that extend generally rearwardly and upwardly to a central horizontal hand grip portion to form a generally inverted U-shaped handle 35. One or more cross bars and a wire frame may be provided between the lateral side portions, as with a conventional shopping cart. The casters for the front wheels 33 may be supported on a front caster support extending between the lower rails, or may be connected directly to a portion of the lower section of the frame in a conventional known manner. A wire frame cargo deck 36 shaped to correspond to the shape of the underlying portions of the lower section 34 of the frame 31 is secured thereto for transporting bulk items.

The frame 31 also includes a pair of tubular support arms 37 that extend forwardly from the lateral side portions of the handle 35 in laterally opposed relation. A series of inverted generally U-shaped bag support members 38 formed of bent wire are secured to the support arms 37 in laterally opposed longitudinally spaced adjacent relation and extend a short distance upwardly from the top surface of the support arms. The support arms 37 are spaced apart a distance slightly greater than the width of the front and rear end wall panels 12 of the reusable shopping bag 10, and the distance between the down turned legs of each inverted U-shaped bag support member 38 is approximately the same as the width of the narrower side wall panels 13 of the reusable shopping bag.

As shown in FIG. 3A, a number of the reusable shopping bags 10 may be supported on, and suspended from, the forwardly extending support arms 37 of the shopping cart 30, by placing their shorter flexible loop-type support handles 17 (FIG. 1, 1A, 1B) over a respective laterally opposed pair of the U-shaped bag support members 38, such that the reusable shopping bags are supported in a full open condition.

Alternatively, the modified reusable shopping bags having the combination sleeve/pocket may be supported on, and suspended from, the forwardly extending support arms 37 of the shopping cart 30, by placing the open bottom longitudinal side 16A of the sleeve 15 over a respective laterally opposed pair of the U-shaped bag support members 38, such that the reusable shopping bags are supported in a full open condition.

The shopping cart 30 may be provided with a conventional folding child carrier 39 for carrying infants and small children. The carrier 19 is of known conventional wire frame construction, and includes a back support, and a seat, and the wire frame between the lateral side portions of the handle 35 of the cart is provided with openings through which the legs of the infant extend, in a conventional manner.

Figure 3B:
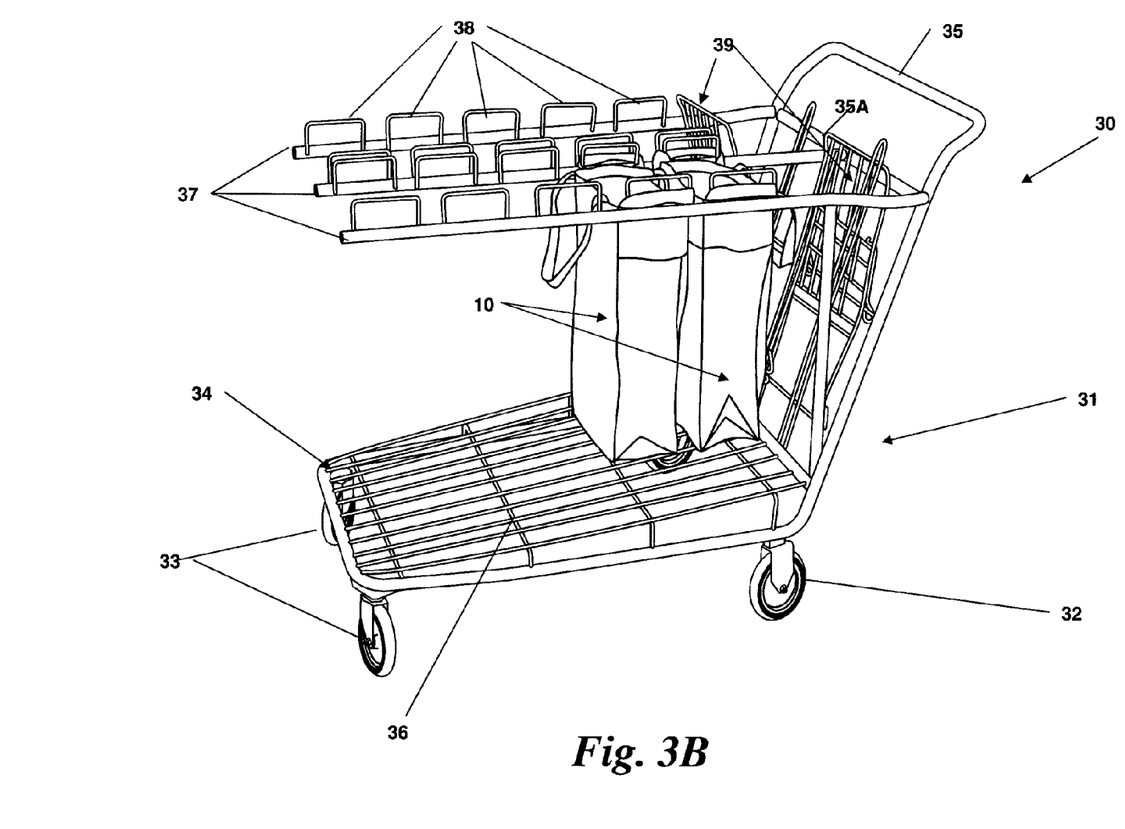
FIG. 3B is a perspective view of a modification of the shopping cart of FIG. 3A having three support arms for supporting and transporting a plurality of the present reusable shopping bags.

FIG. 3B shows a modification of the shopping cart 30 wherein the frame 31 has three forwardly extending support arms 37. The components that are the same as those previously described with reference to the embodiment of FIG. 3A are assigned the same numerals of reference, but some of the components are not shown and not described again in detail to avoid repetition. In this modification the frame 31 has a central support arm 37 secured at a rear end to a transverse cross bar 35A extending between the sloping lateral side portions of the handle 35, and a pair of outer support arms 37 each laterally spaced from the central support arm that are secured at a rear end to the sloping lateral side portions of the handle 35. The three support arms 37 are spaced apart a distance slightly greater than the width of the end wall panels 12 of the reusable shopping bag 10, such that two rows of the reusable shopping bags may be supported on, and suspended from, the forwardly extending support arms in a full open condition. A generally vertical upright support bar may be provided between each of the lower lateral side rails and the outermost rack arms 37. Also, in this modification, the shopping cart 30 may be provided with two laterally spaced conventional folding child carriers 39 for carrying infants and small children.

As with the previous embodiment, a number of the reusable shopping bags 10 may be supported on, and suspended from, the forwardly extending support arms 37 of the shopping cart 30, by placing their shorter flexible loop-type support handles 17 over a respective laterally opposed pair of the U-shaped bag support members 38, such that the reusable shopping bags are supported in a full open condition.

It should be understood from the foregoing description that a shopper utilizes the reusable shopping bags 10 which are supported on the shopping carts 30 for holding a number of items rather than placing the items into a basket of a shopping cart basket in the conventional manner.

Figure 4A:
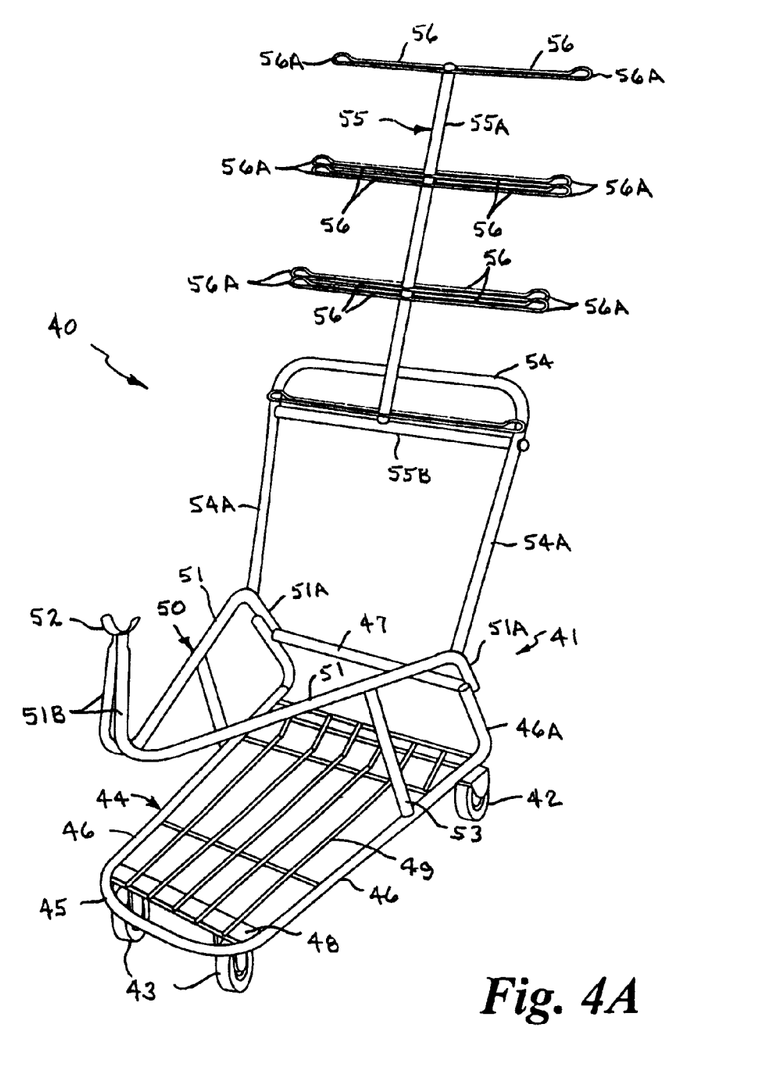
FIGS. 4A, 4B and 4C are perspective views of a second embodiment of a shopping cart having a generally T-shaped support arm for supporting and transporting a plurality of the present reusable shopping bags.
Figure 4B:
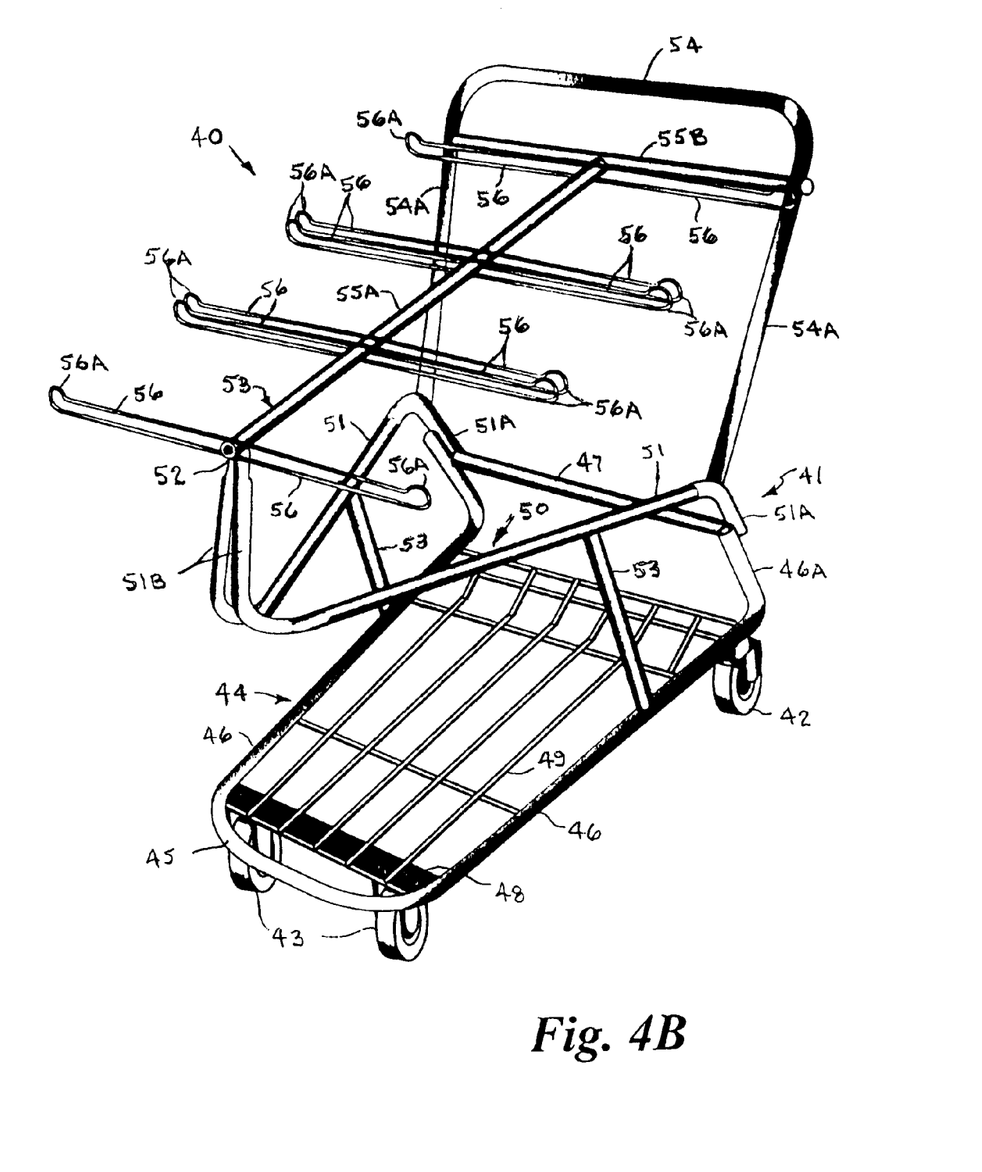
Figure 4C:
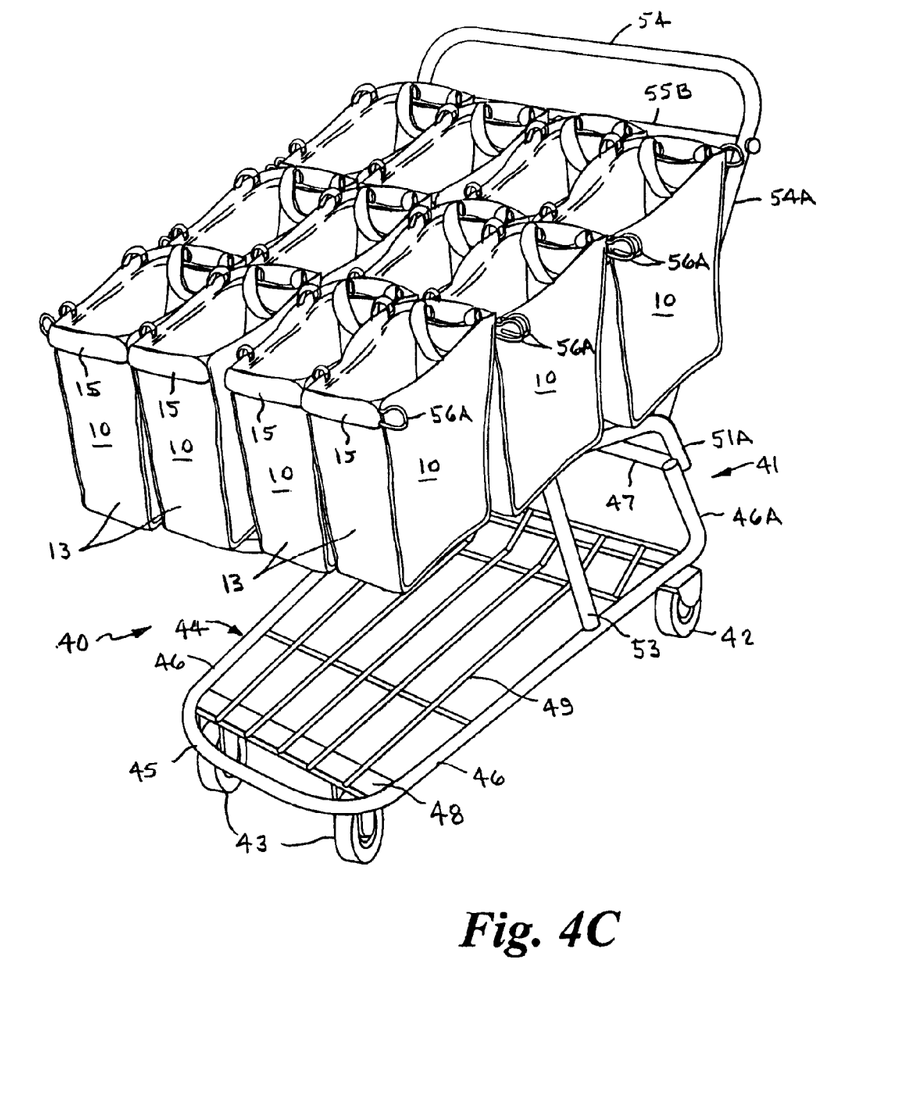

FIGS. 4A, 4B and 4C are perspective view of a second embodiment of a shopping cart 40 for supporting and transporting a plurality of the present reusable shopping bags 10. The components that are the same as those previously described are assigned the same numerals of reference, but some of the components are not shown and not described again in detail to avoid repetition. The shopping cart 40 includes a frame 41 supported on a pair of rear wheels 42 and a pair of front wheels 43, with each of the front wheels being mounted on a caster. The frame 41 may be constructed of tubular aluminum or steel, or any other suitable material such as plastic as long as strength and durability considerations are satisfied.

The frame 41 includes a generally U-shaped lower section 44 having a curved front portion 45 and a pair of lower lateral side rails 46 that extend rearwardly therefrom diverging along their length and terminate in upturned end portions 46A. A cross bar 47 may be provided between the upturned end portions 46A. A front caster support 48 extends between the lower rails 46 in a position to support the casters for the front wheels 43 in a known manner. The caster support 48 may be formed from a flat plate. Alternatively, the casters may be connected directly to a portion of the lower section 44 of the frame 41. A wire frame cargo deck 49 shaped to correspond to the shape of the underlying portions of the lower section 44 of the frame 41 is secured thereto for transporting bulk items.

The frame 41 also includes a generally V-shaped upper section 50 having a pair of upper lateral side rails 51 with down turned rear end portions 51A that are secured to the upturned end portions 46A of the lower lateral side rails 46. The lateral side rails 51 of the upper section 50 extend forwardly and angularly upward from the upturned end portions 46A of the lower lateral side rails 46 converging along their length and terminate in upturned front end portions 51B. A curved yoke 52 is secured to the upturned front end portions 51B. An upright support bar 53 may be provided between the lower lateral side rails 46 and upper lateral side rails 51.

The frame 41 also includes an inverted generally U-shaped handle 54 having a pair of sloping lateral side portions 54A that are secured at their lower ends to the down turned end portions 51A of the upper lateral rails 51 and extend generally rearwardly and upwardly to the central horizontal handle 54.

A generally T-shaped tubular support arm 55 is pivotally mounted on the handle 54. The support arm 55 has an elongate central tubular member 55A with a horizontal crossbar 55B at one end that is pivotally connected between the lateral side portions 54A of the handle 54. A series of pairs of bag support arms 56 formed of bent wire are secured at their back ends to opposite sides of the central tubular member 55A of the support arm 55 in laterally opposed longitudinally spaced adjacent relation and extend laterally outward therefrom. Preferably, the bag support arms 56 are longitudinally spaced apart approximately the same distance as the laterally spacing between the outwardly extending support arms of a conventional "T-shirt bag" holding rack. In the illustrated example, the outer ends of the bag support arms 56 are formed to have the shape of an upwardly directed looped protuberance 56A. FIG. 4A shows the generally T-shaped tubular support arm 55 in a raised position to allow a number of the carts to be nested together.

FIG. 4B shows the generally T-shaped tubular support arm 55 in a lowered position supported at its front end in the curved yoke 52 at the top of the upturned front end portions 51B of the V-shaped upper section 50 of the frame 41 in a position to receive a number of the reusable shopping bags 10.

As shown in FIG. 4C, a number of the reusable shopping bags 10 may be supported on, and suspended from, the outwardly extending bag support arms 56 of the tubular support arm 55 of the shopping cart 40, by slipping the tubular open-ended sleeves 15 at the upper end of the end wall panels 13 over the bag support arms, such that the bags are supported in a fully open condition. It should be understood that the bag modifications of FIG. 1A having the combination sleeve/pocket, and FIG. 1B, having pairs of loops on the side walls, may be supported in a full open condition on the outwardly extending laterally opposed support arms 56 in the same manner.

Although some components of the present shopping carts 30, 40 have been described for purposes of example, as being of wire frame construction, it should be understood that they may be formed of any other suitable material such as plastic.

Cart Adapter

Figure 5A:
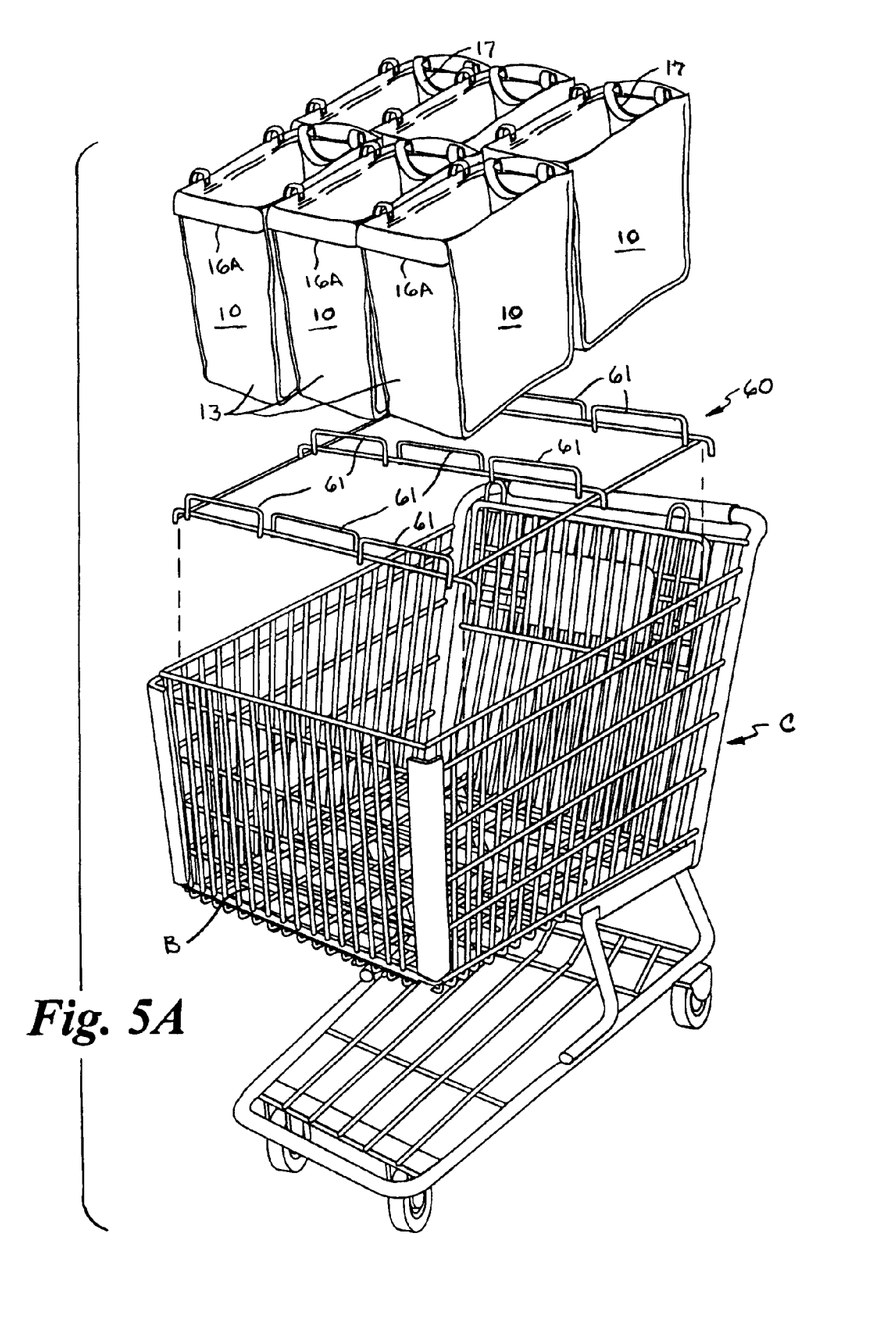
FIGS. 5A and 5B are perspective views illustrating a shopping cart adapter rack which is placed onto a conventional shopping cart for supporting and transporting a plurality of the present reusable shopping bags.
Figure 5B:
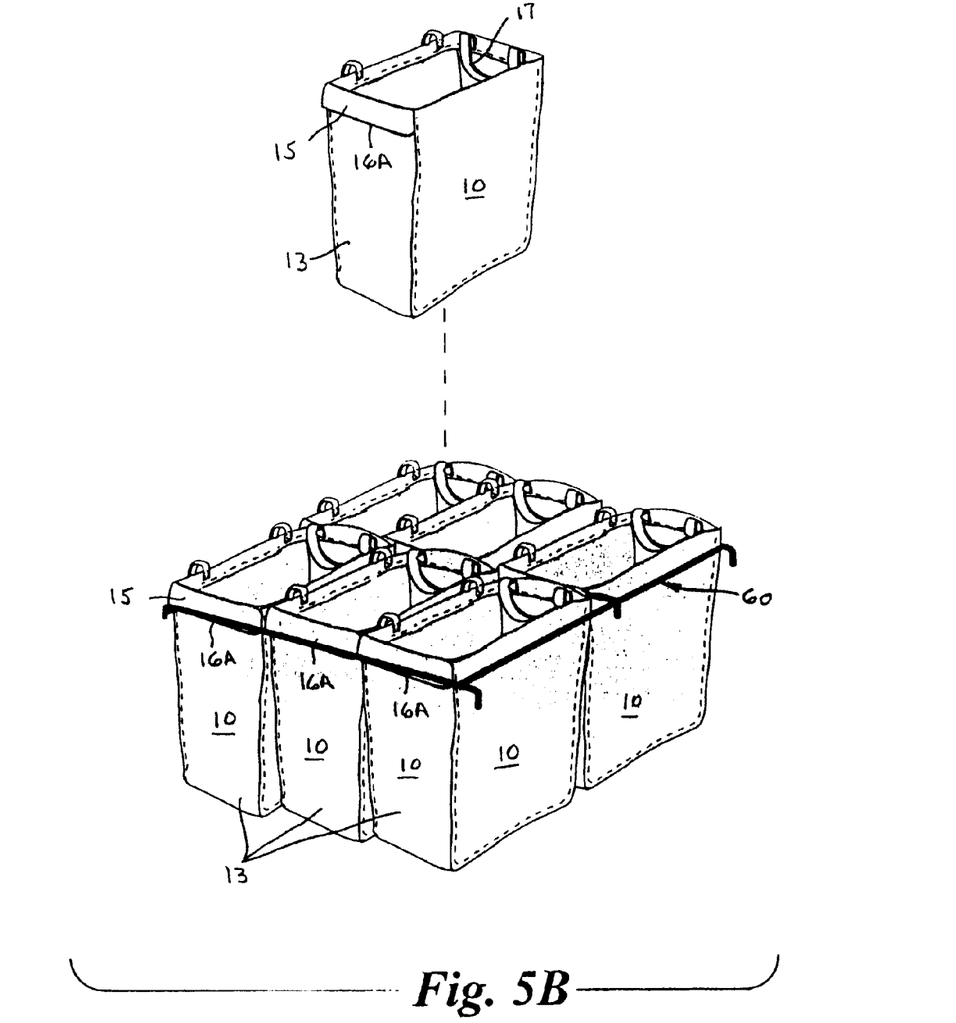

FIGS. 5A and 5B show a shopping cart adapter rack 60 which can be placed onto the basket B of a conventional shopping cart C for supporting and transporting a plurality of the present reusable shopping bags. The adapter rack 60 is formed of bent wire and has a series of inverted generally U-shaped bag support members 61 disposed in laterally opposed longitudinally spaced relation. Preferably, the opposed bag support members 61 are spaced apart approximately the same distance as the laterally spacing between the outwardly extending support arms of a conventional "T-shirt bag" holding rack. The cart adapter rack 60 is placed on the basket of the conventional shopping cart C and a plurality of the reusable shopping bags 10 are placed on the bag support members 61 of the cart adapter rack. In the illustrated example, the bags 10 are supported in a full open condition on the adapter rack 60 by placing the open bottom longitudinal side 16A of the sleeve 15 over a respective laterally opposed pair of the U-shaped bag support members 61, however, they may also be supported by placing their shorter flexible loop-type support handles 17 on the bag support members 61 of the cart adapter rack, as described above.

Checkout and Bagging Method

Figure 6:
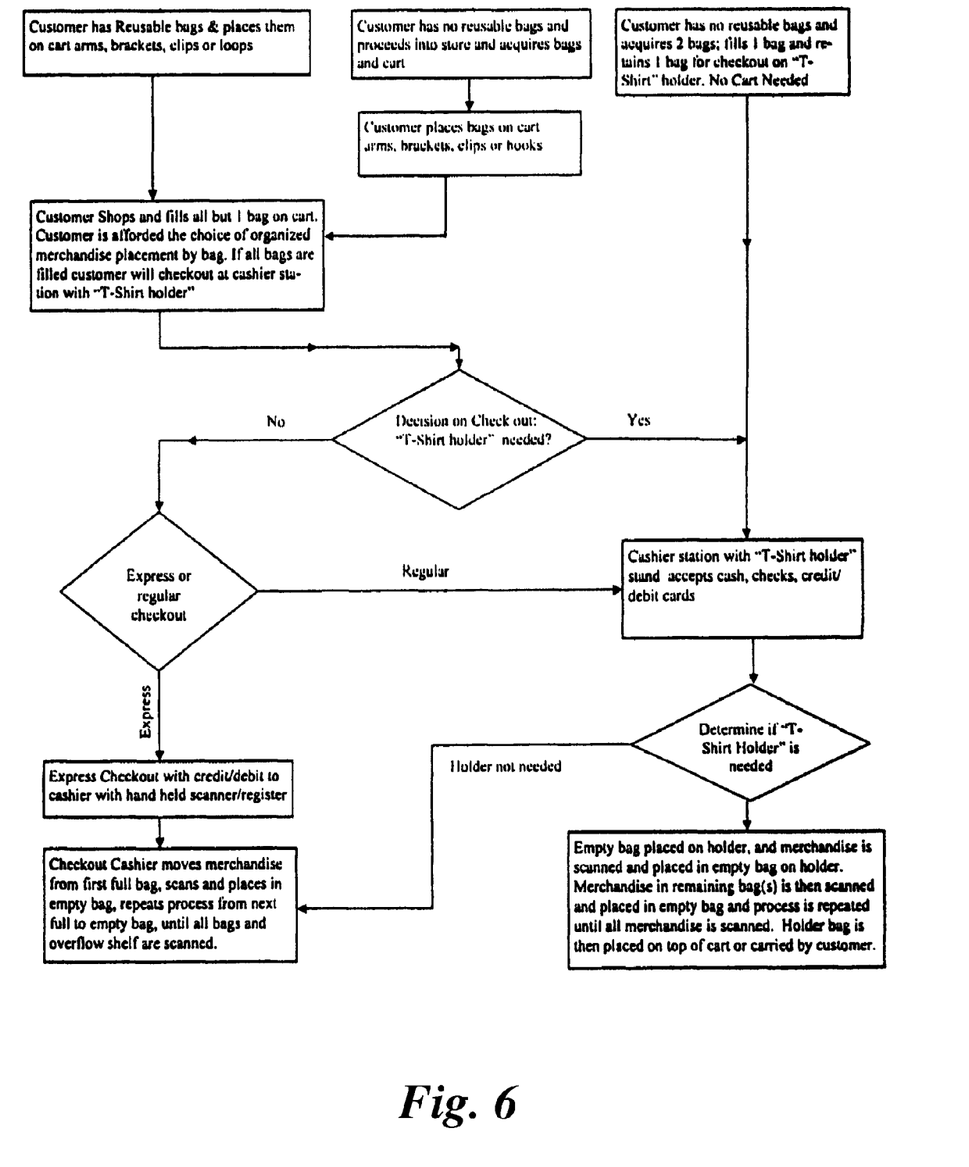
FIG. 6 is a flow chart illustrating an improved register checkout and bagging procedure utilizing the present reusable shopping bags and shopping cart.

The reusable shopping bags 10 and shopping carts 30 and 40 or cart adapter rack 60 provide an improved register checkout and bagging procedure, wherein one empty reusable shopping bag is used at the checkout area, as represented on the right-hand side of the block diagram of FIG. 6. When a customer enters the store, he or she has three options. If the customer has his or her own reusable shopping bags constructed in accordance with the present invention, he or she can place one or more reusable shopping bag on the specially designed cart and loads items to be purchased into the bags and may or may not leave one empty bag to be used for checkout. If the customer does not have reusable shopping bags constructed in accordance with the present invention, he or she can acquire them from the store, place one or more of the reusable shopping bags on the specially designed cart and load items to be purchased into the bags, and may or may not leave one empty bag to be used for checkout. If the customer only needs to purchase a few items, and a shopping cart is not required, the customer may utilize one or more reusable bags for loading items to be purchased and one empty bag for checkout.

If all of the bags are loaded, or if the customer does not utilize a cart, the customer proceeds to a checkout area having a conventional existing "T-shirt bag" holding rack in the bagging area. An empty reusable bag is placed on the arms of the conventional existing "T-shirt bag" holding rack in the bagging area. The customer then takes each item out of a loaded bag, scans it across the bar code scanner, and places it into the empty bag on the arms of the bag holding rack. After the previously empty bag has been filled, it can be removed, and the customer can then place the bag from which the items were unloaded (which is now empty) onto the support arms of the bag holding rack and repeat the process until all of the items have scanned and bagged. The loaded reusable bags can then be placed onto the bag support members of a specially designed shopping cart, or into a conventional shopping cart, and transported to the customer's vehicle, or simply be carried by hand using the elongate handles in the manner of a conventional "tote" type shopping bag, depending upon the number of loaded bags.

If the customer is using a specially designed cart, and one bag remains empty, he or she may proceed to an "express checkout" station that utilizes a handheld scan gun. The empty bag will be supported in a full open position on the specialized cart adjacent to the filled bags and remain on the cart throughout the checkout process. In this process, the items are merely removed from a filled bag, scanned and placed in the adjacent empty bag on the cart and the process continues until all bags have been scanned.

A unique bar code may be attached to each bag that will associate it with its owner or the customer that is purchasing the bag, thus providing a tracking shopping list service for future shopping visits and electronic reminders.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein.

Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention. Thus, it shall be understood that while this invention has been described with respect to various specific examples and embodiments, the invention is not limited thereto and that it can be variously practiced within the scope of the following claims.

The invention claimed is:

1. A reusable shopping bag and shopping cart system for use in containing and transporting items, comprising:
    a generally rectangular soft-sided expandable and collapsible reusable shopping bag having a bottom wall panel, opposed front and rear end wall panels, two laterally opposed side wall panels defining an open top end and an interior volume, said opposed front and rear end wall panels being of a width greater than the width of said laterally opposed side wall panels and to fit between laterally spaced apart support arms of a conventional plastic T-shirt bag holding rack, an elongate flexible loop carrying handle secured to an upper end portion of each of said opposed front and rear end wall panels for carrying said bag in the manner of a tote-type shopping bag, and a pair of looped support members one on each of said side wall panels at an upper end thereof configured to receive the laterally spaced apart support arms of the holding rack to support said shopping bag thereon in a fully open condition; and
    a shopping cart having a frame with a generally U-shaped lower portion supported on wheels, lateral side rails extending upwardly from a rear end of said lower portion, one or more cross bars extending transversely between said lateral side rails, a hand grip portion extending between upper ends of said side rails, and a pair of tubular arms each extending forwardly from a respective said lateral side rail of said shopping cart frame in generally parallel laterally spaced relation; and
    a plurality of inverted generally U-shaped bag support members secured to each of said laterally spaced tubular arms to extend a short distance upwardly therefrom in adjacent longitudinally spaced relation, said tubular support arms and said U-shaped bag support members disposed in laterally opposed relation spaced apart a distance sufficient to receive said looped support members of a respective said shopping bag to support said shopping bag thereon in a fully open condition;
    said looped support members on each of said side wall panels of said reusable shopping bag being removably placed on said bag support members of said cart to support said shopping bag in a full open condition on said cart and, when removed therefrom, being removably placed on the laterally spaced apart support arms of the holding rack to support said shopping bag in a full open condition on the laterally spaced apart support arms of the holding rack.

2. The shopping bag and shopping cart system according to claim 1, wherein
    said pair of looped support members of said shopping bag comprise a flexible loop support handle secured to an upper end portion of each of said laterally opposed side wall panels, whereby said shopping bag is removably supported in a full open condition by placing said shorter flexible loop support handles on respective laterally opposed pairs of said bag support members.

3. The shopping bag and shopping cart system according to claim 1, wherein
    said pair of looped support members of said shopping bag comprise an elongate generally rectangular open-ended sleeve at an upper end of each of said side wall panels having upper and lower longitudinal sides extending transversely across said side wall panels for slidably receiving the outwardly extending laterally opposed arms of the holding rack to support said shopping bag thereon in a fully open condition.

4. The shopping bag and shopping cart system according to claim 3, wherein
    said lower longitudinal side of each said open-ended sleeve is secured at bottom corners to a respective said side wall panel to form a bottom opening for slidably receiving a respective one of said laterally opposed bag support members of said shopping cart to support said shopping bag thereon in a fully open condition.

5. The shopping bag and shopping cart system according to claim 1, further comprising:
    a third said tubular arm extending forwardly from an upper said cross bar extending transversely between said lateral side rails, said third tubular arm disposed centrally between said pair of tubular arms in generally parallel spaced relation thereto such that two rows of said reusable shopping bags may be supported on, and suspended from, said bag support members of said forwardly extending tubular arms in a full open condition.

6. A reusable shopping bag and shopping cart system for use in containing and transporting items, comprising:

a generally rectangular soft-sided expandable and collapsible reusable shopping bag having a bottom wall panel, opposed front and rear end wall panels, two laterally opposed side wall panels defining an open top end and an interior volume, said opposed front and rear end wall panels being of a width greater than the width of said laterally opposed side wall panels and to fit between laterally spaced apart support arms of a conventional plastic T-shirt bag holding rack, an elongate flexible loop carrying handle secured to an upper end portion of each of said opposed front and rear end wall panels for carrying said bag in the manner of a tote-type shopping bag, and a pair of looped support members one on each of said side wall panels at an upper end thereof configured to receive the laterally spaced apart support arms of the holding rack to support said shopping bag thereon in a fully open condition; and a shopping cart frame with a generally U-shaped lower portion supported on wheels, lateral side rails extending upwardly from a rear end of said lower portion, one or more cross bars extending transversely between said lateral side rails, a hand grip portion extending between upper ends of said side rails, and a tubular arm extending forwardly from an upper said cross bar extending transversely between said lateral side rails; and a plurality of bag support arms secured at back ends to opposite sides of said tubular arm in longitudinally spaced adjacent relation having outer ends extending outward therefrom in parallel spaced apart relation a distance sufficient to receive said looped support members of a respective said shopping bag to support said shopping bag thereon in a fully open condition;

said looped support members on each of said side wall panels of said reusable shopping bag being removably placed on said bag support arms of said cart to support said shopping bag in a full open condition on said cart and, when removed therefrom, being removably placed on the laterally spaced apart support arms of the holding rack to support said shopping bag in a full open condition on the laterally spaced apart support arms of the holding rack.

* * * * *